July 12, 1938.  W. A. MORTON  2,123,544
METHOD OF MELTING AND REFINING GLASS
Filed Feb. 14, 1935
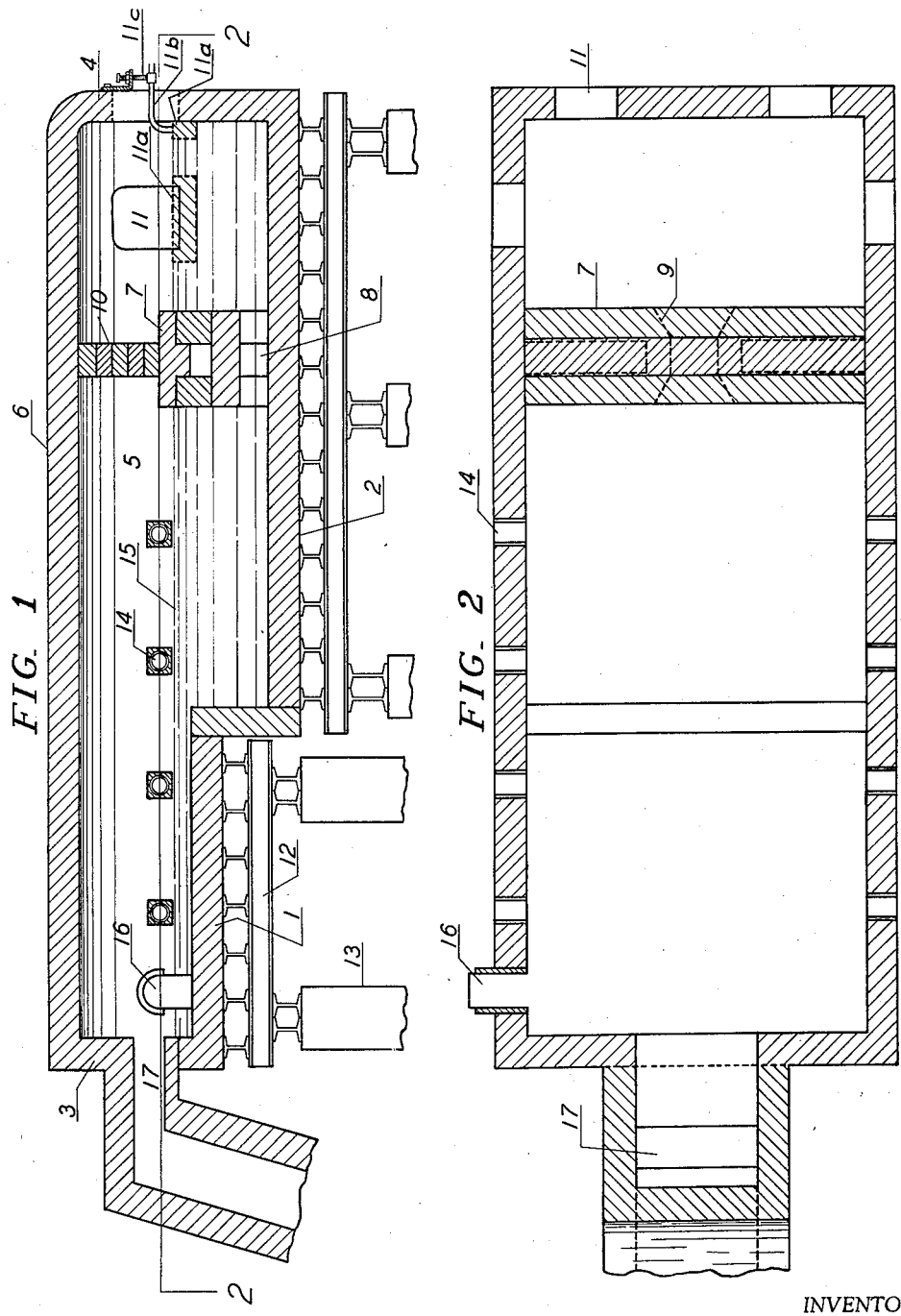
INVENTOR.
William A. Morton
BY William B. Jaspert
ATTORNEY.

Patented July 12, 1938

2,123,544

UNITED STATES PATENT OFFICE 2,123,544

METHOD OF MELTING AND REFINING GLASS

William A. Morton, Mount Lebanon, Pa., assignor to Amco, Incorporated, Pittsburgh, Pa., a corporation of Pennsylvania Application February 14, 1935, Serial No. 6,435

1 Claim. (Cl. 49—77)

This invention relates to new and useful improvements in the method of and apparatus for melting glass and other materials that are reduced in the presence of a flux, and it is among the objects thereof to subject the ingredients to be melted to a more nearly uniform temperature treatment to produce a homogeneous compound at a given melting temperature.

Conventional methods of melting glass employ a hearth of uniform depth into which the materials, principally sand, soda and lime are charged at one end, which is at the point of maximum heat application, and the refined or planed glass is withdrawn at the opposite end. Because of the convection currents set up in the glass which cause mixing inclusions, cord, so-called due to the intermingling of the unplaned and sometimes unmelted ingredients with the refined glass, this type of furnace must be of a capacity in excess of that required by my method for the production requirements to allow for the proper planing of the glass in the refining area of the tank.

Various modifications of the conventional hearth type tanks have been heretofore proposed, a notable one of which is the rotary furnace in which the metal is permitted to fall from the walls of the horizontal cylinder as it rotates. This type of furnace has been tried with indifferent success because of the varying conditions under which the refractory must function; first as a melting hearth, then as a furnace wall subjected to exceedingly high temperatures. The furnace lining erosion is the greatest problem because of the action of the batch materials rich in flux, heated to the softening temperature of the furnace lining. Another factor against the successful operation of the rotary furnace is the rapid surface movements of the freshly charged materials.

Other types of furnaces are likewise directed to methods of melting batch material which require the rapid movement of these materials in the furnace chamber resulting in a loss of control of the freshly charged raw materials which separate before they are completely fused into a homogeneous mass.

It is a primary object of the present invention to prevent the disassociation of the raw materials which melt at different temperatures and to cause their fusion in a relatively static state into a homogeneous compound at a temperature of about 2600° F.

To the accomplishment of this purpose, I utilize a melting furnace which may be divided into melting, refining and working chambers, the melting portion of which is a relatively shallow hearth of substantial length, the refining area a coextensive portion having a very deep hearth of about the same length, and a working chamber divided from the refining chamber by a bridge wall having a throated passage at the bottom thereof. A substantially uniform and common level of glass is maintained in the melting, refining and working compartments of the furnace although provision may be made for varying the level of the glass furnace to subject the upper and lower levels of the glass on the shallow melting hearth to the desired temperature differentials.

The structure will be more readily understood in connection wtih the accompanying drawing constituting a part hereof in which like reference characters designate like parts and in which:

Fig. 1 is a vertical section longitudinally of a glass melting furnace embodying the principles of this invention; and Fig. 2 is a horizontal cross-section taken along the line 2—2, Fig. 1.

In the drawing, the numeral 1 designates a shallow melting hearth, 2 a deeper off-set portion of the hearth, 3 and 4 the end walls of the furnace, 5 the side walls and 6 the roof. A bridge wall 7 divides the furnace chamber into a melting and working chamber having a passage 8 which is beveled or chamfered at 9 as shown in Fig. 2. A partition wall 10 joins the bridge wall 7 with the side walls and roof of the furnace to prevent dust or other foreign particles from passing into the working chamber. Openings 11 are provided in the walls of the working chamber for removal of the glass. The take-out openings 11 in the working compartment extend below the normal level of the glass as determined by the level in the melting and refining chambers, and these openings may communicate with forehearth structures of mechanical feeding devices to which the glass from the working chamber is continuously supplied. In practice, a skimmer block is usually provided in the furnace to extend below the level of the glass in the working chamber as a safeguard for the prevention of access of surface glass to the forehearth. Such blocks are not adjustable. In the present instance, a block 11a determines the level of glass on the melting hearth 1 and in the refining chamber, and by adjusting this block to various heights above the bottom of the opening 11, the melting rate and temperature of the glass is varied. Block 11a is mounted by a water cooled bracket 11b which is adjustable by a screw 11c to different heights relative to the bottom of the opening 11. On account of the constricted flow passage 8 at the bottom of the bridge wall 7, the rate of movement of glass flow from the refining chamber to the working chamber is dependent upon the temperature of the glass in the refining chamber as the temperature determines the viscosity of the glass flowing through the passage which determines the rate of flow to the working chamber that is not materially affected by the rate of withdrawal of the glass from the chamber through the openings 11.

The hearth structure is supported on a superstructure of I-beams 12 supported on concrete piers or columns 13. Burner ports 14 are provided along the side walls of the furnace adjacent the surface of the glass pool, the level of which is designated by the numeral 15. A materials charging opening 16 is provided at one end of the shallow hearth and a waste gas passage 17 extends from the melting chamber to a recuperator structure for preheating the air that supports combustion at the burner ports 14. The length of the hearth portion 1 is approximately 50% of the total length of the melting and refining chamber and may vary in depth preferably not greater than 12" and as low as 2" depending upon the desired furnace capacity. The deep portion or refining end of the melting chamber is determined by the temperature drop desired in the working chamber which is usually maintained at 2100° F., this being the temperature at which the glass is at the proper viscosity to be worked. As all of the heat, with but slight variation, is applied to the surface of the glass pool in the melting and refining chamber, the depth of the pool disregarding heat loss by radiation through the furnace wall and hearth determines the temperature of the glass at the bottom of the pool. Because of heat loss by variation, the depth of the pool in the refining area may be 3' and vary to 4' and may be increased for sheet glass machines where the temperature of the glass to be worked is less than 2000° F.

The refined glass passes through the throat 8 which is chamfered to lower the resistance of the flow to the working chamber while being of sufficiently restricted area to prevent thermal convectional recirculation between the two chambers. The throat is designed to permit the movement of predetermined quantities of planed glass from the bottom of the furnace at the viscosity existing for the depth. If resistance is too great, glass of lesser viscosity will be drawn from nearer the surface and upset the delivery of molten glass at the desired temperature.

In operation, the batch materials comprising sand, soda and lime are charged onto the shallow hearth 1 through the opening 16 and the melted compound flows over the stepped hearth into the refining chamber. The hearth 1 is of sufficient length to melt and fuse the ingredients before passing into the refining compartment, and when the furnace is filled to the level shown at 15, the movement of the glass from the shallow hearth 5 to the refining area is retarded to the extent of avoiding separation of the ingredients before they are fused into a homogeneous compound with the silica at about 2600° F. This is important since the temperature at which the sand melts is approximately 2900° F., soda 1472° F. and lime disassociates at 1652° F.

If, therefore, the raw batch materials are permitted to separate, they will melt and disassociate at different times, resulting in a non-homogeneous compound, and by feeding the raw materials onto the shallow hearth, the glass will move along the shallow hearth at a definite velocity established by the rate of withdrawal through the passage 8. Refining of the glass is constant because the normal surface temperature is maintained to lower the viscosity sufficiently to free the included gases from the fluxes and the usual motion or turbulence in a common pool created by the fluxes is virtually absent, by my method which is one of dependent isolation.

By increasing the volume of metal in the contiguous portion of the hearth, the velocity of motion is immediately decreased, and the refining action begins. By thus cutting down the mechanical currents or movement of the glass, the included gases in the mass move to the surface of the pool by their buoyancy out of control of the stream flow.

By employing the shallow hearth with the coextensive surface of the relatively deep hearth, a substantially static condition is maintained. The refining metal in the latter acts as a support against any rapid movement on the surface in the shallow portion of the hearth. Refinement is thus obtained by predetermined velocity changes, a proper relation of length and depth of elements, and only planed glass which accumulates at the bottom of the deep pool is removed to the working chamber, thereby preventing accumulations of glass of varying ages under heat which results in defective glass in the final product.

I claim:

The method of melting and refining glass in a furnace divided into communicating melting, refining and working chambers, which comprises feeding the glass batch materials to the melting chamber in the presence of a reducing heating environment, directing the melted glass materials to the refining chamber, thence to the working chamber and varying the level of the glass in the working chamber to thereby control the velocity of the flow of molten glass from the melting hearth.

WILLIAM A. MORTON.